United States Patent
McCavit et al.

(10) Patent No.: US 10,237,942 B2
(45) Date of Patent: Mar. 19, 2019

(54) METHOD OF ILLUMINATING ORNAMENT BY DETERMINING IF THE ORNAMENT IS LOCATED INDOORS OR OUTDOORS

(71) Applicant: Jenesis International Inc., Benton Harbor, MI (US)

(72) Inventors: Kim Irwin McCavit, Saint Joseph, MI (US); Bradford Brian Jensen, Saint Joseph, MI (US); Roger Donn Bentley, Coloma, MI (US)

(73) Assignee: Jenesis International Inc., Benton Harbor, MI (US)

( * ) Notice: Subject to any disclaimer, the term of this patent is extended or adjusted under 35 U.S.C. 154(b) by 0 days.

(21) Appl. No.: 15/627,642

(22) Filed: Jun. 20, 2017

(65) Prior Publication Data
US 2018/0368229 A1   Dec. 20, 2018

(51) Int. Cl.
*H05B 33/08* (2006.01)
*H05B 37/02* (2006.01)

(52) U.S. Cl.
CPC ..... *H05B 33/0854* (2013.01); *H05B 37/0281* (2013.01)

(58) Field of Classification Search
CPC .......... H05B 33/0854; H05B 37/0281
See application file for complete search history.

(56) References Cited

U.S. PATENT DOCUMENTS

| | | | | | |
|---|---|---|---|---|---|
| 5,990,628 | A * | 11/1999 | Birrell | ................... | G01J 1/4204 250/206 |
| 7,339,471 | B1 * | 3/2008 | Chan | ................... | G08B 15/002 315/159 |
| 8,450,944 | B2 * | 5/2013 | Joseph | ............... | H05B 37/0263 315/209 R |
| 8,592,744 | B2 * | 11/2013 | Van Dalen | ............ | G01J 1/4204 250/226 |
| 9,407,829 | B1 * | 8/2016 | McCarthy | .......... | H04N 5/23206 |
| 9,706,364 | B2 * | 7/2017 | Kay | ........................ | H04W 4/04 |
| 9,832,833 | B1 * | 11/2017 | Pipe-Mazo | ........ | H05B 33/0854 |
| 2003/0009264 | A1 * | 1/2003 | Schanin | ............. | H05B 37/0218 700/291 |
| 2005/0212443 | A1 * | 9/2005 | Yukawa | ................. | G08B 15/00 315/129 |
| 2006/0091822 | A1 * | 5/2006 | Bierman | ............ | H05B 37/0218 315/244 |
| 2014/0028198 | A1 * | 1/2014 | Reed | ................... | H05B 33/0854 315/152 |

\* cited by examiner

*Primary Examiner* — Alexander H Taningco
*Assistant Examiner* — Krutis R Bahr
(74) *Attorney, Agent, or Firm* — George Pappas

(57) ABSTRACT

An ornament designed for both indoor and outdoor use incorporates a method for automatically detecting if the ornament is being used indoors or outdoors and for thereby activating the ornament at the appropriate desired time for a desired period of time. The method monitors ambient light levels throughout the day to determine if the monitored values match the characteristics expected from either indoor or outdoor operation. When used indoors, the ornament is activated at the same time each day for a predetermined number of hours. When used outdoors, the ornament is activated each day at sunset for a predetermined number of hours. In addition, when used outdoors, the method measures night lengths and adjusts its activation time to run longer when nights are long, as in winter, or shorter when nights are short, as in summer.

28 Claims, 7 Drawing Sheets

METHOD OF ILLUMINATING ORNAMENT BY DETERMINING IF THE ORNAMENT IS LOCATED INDOORS OR OUTDOORS

BACKGROUND OF THE INVENTION

1. Field of the Invention

The present invention relates generally to a battery powered, illuminated ornament that is intended tor both indoor and outdoor operation that can automatically determine if it is being used indoors or outdoors and also determine the season of the year and which can adjust the on time automatically.

2. Background

The use of illuminated ornaments and decorations to celebrate various holidays or create a desired ambiance is well known. In many cases it is desirable to turn these products on only during certain hours of the day either to conserve energy, especially with battery operated products, or to make sure the light from the ornament does not interfere with other activities such as sleep. For line voltage operated ornaments, such as Christmas tree lights, there are a multitude of timers that can be connected between the ornament and the wall socket to control when the ornament turns on and off. This type of timer comes in two varieties; one for indoor use and one for outdoor use. A typical indoor timer for use with illuminated ornaments would turn the ornament on at the same time each day and then off a certain number of hours later. For example, the lights on a Christmas tree might be turned on at 6 PM each night and then turned off at 11 PM when the household retires for the night. A typical outdoor timer would use a light sensor to turn the ornaments on when light levels change from bright to dark (shortly after sunset) and then turn the ornament off several hours later. In typical timers, the amount of time the ornament remains on can be selected by the user. Many battery operated illuminated ornaments, such as Christmas ornaments and artificial candles, require timers for the same reasons as above but the timers are incorporated into the ornaments' electronics. These internal timers also come in two varieties for either indoor or outdoor use. As above, illuminated ornaments with internal timers for indoor use would typically use a 24 hour repeating timer that turns the ornament on at the same time each day and then turns off again at a selected time later. Illuminated ornaments with timers for outdoor use would typically use a light sensor to turn the ornament on when it gets dark in the evening and then turn the ornament off again a selected time later. For purposes of this description, an "indoor timer" will always refer to a 24 hour repeating timer that starts and stops at a fixed time each day and an "outdoor timer" will always refer to a timer that uses a light sensor to start when it gets dark each day and then turns off a selected amount of time later.

When used outdoors, it is highly desirable to use a light sensor that turns the ornament on when it gets dark rather than at a fixed time each day. In middle latitudes the time of sunset can vary significantly. In Chicago, Ill., USA for example, the latest sunset in 2017 will occur in June at 8:29 PM. The earliest sunset will occur in December at 4:19 PM. A timer that turns on at a fixed time each day would need to be periodically adjusted to remain synchronized with actual sunset times. For outdoor ornaments, using a timer that turns on when it gets dark instead of at a fixed time makes sure the ornament is illuminated when it is supposed to be.

A desirable feature for an ornament with an outdoor timer is the ability to select different amounts of time that the ornament remains on. This allows the amount of time that the ornament remains on to be matched to the season of the year. For instance, assume that it is desired that the ornament remain on until midnight each night. Using the above example of Chicago, selecting an on time of about 4 hours will meet this requirement in June, but in December the on time will need to be almost 8 hours. In battery operated products, especially, running the minimum amount of time necessary is desirable in order to prolong battery life.

In many cases, it is desirable that an illuminated ornament be usable both indoors and outdoors. A typical indoor timer will be disappointing if used outdoors since it will not stay synchronized with the change in sunset times. A typical outdoor timer will not work indoors (unless it is in a window) since it is not exposed to daylight. If the indoor light levels are less than typical outdoor light levels, the light sensor will never see a transition from bright light to dark and never turn on. If the indoor light levels are bright enough to be detected by the timer's light sensor, the ornament will turn on whenever the interior lights are switched from on to off, which would also be undesirable.

Prior art illuminated ornaments that are intended to be used both outdoors and indoors include both an indoor and an outdoor timer. A switch on the ornament is used to manually select either the indoor timer or the outdoor timer depending on where the ornament is placed. When used on a mantle in a basement, for instance, the user would select the indoor timer that starts at the same time each day since the ornament is not exposed to daylight. If the ornament is placed in a window (equivalent to being outdoors), the switch would be placed in the position that selects the outdoor timer that turns the ornament on each night when it gets dark. To allow the ornament's on time to be adjusted for a particular season of the year, a typical prior art ornament might also include another switch that is used to select how long the product runs when using the outdoor timer. While the added switches do provide indoor and outdoor timer functionality in the same ornament along with the ability to adjust the on time to match seasonal requirements, they add an extra degree of complication and cost.

Accordingly, a need exists for an ornament that can automatically detect if it is being used indoors or outdoors and can also detect the season of the year and adjust the on time automatically. This simplifies the product for the consumer as everything is automatic, and also improves manufacturing efficiency because a common design can be used across a wide range of products.

SUMMARY OF THE INVENTION

The present invention overcomes disadvantageous of prior illuminated ornaments which are intended to be used both outdoors and indoors.

One object of the invention is to provide an electronic timer that automatically detects if it is being used indoors or outdoors and uses different modes of operation when used outdoors or indoors.

Another object of the invention is to provide an electronic timer that measures length of each night and uses the measured night length to determine the season of the year and uses different modes of operation for different seasons.

Another object of the invention is to provide an illuminated ornament that can detect if it is being used indoors or outdoors. When indoors, the ornament will turn on at the same time each day and then turn off a selected amount of time later. When used outdoors, the ornament will turn on when it gets dark each day and then turn off a selected amount of time later.

Another object of the invention is to provide an illuminated ornament that, when used outdoors, measures the length of each night and uses the measured night length to determine the season of the year. During seasons when nights are long, the ornament remains on for longer periods of time than it does during seasons when nights are short.

Another object of the invention is to provide a simple circuit using a light sensor and two inputs of a microcontroller to differentiate between daylight conditions, dusk conditions and nighttime conditions.

These and other aspects of the invention are achieved as described. In general, except near a window, indoor light levels are much less than outdoor light levels during the day. Full daylight light levels are typically over 10,000 lux. Even on overcast days, light levels will exceed 1000 lux. Indoor light levels, away from windows, will typically be 500 lux or less. Light sensors such as photo-transistors are well known in the art and can be used to produce a signal that is proportional to ambient light levels. If a light sensor incorporated into a device produces a signal that indicates light levels are in excess of typical indoor light levels, it is an indication that the device is outdoors or near a window. Another characteristic of light levels outdoors is that the light level will be in excess of typical indoor light levels for many hours continuously. If a light sensor incorporated into a device produces a signal that indicates light levels are in excess of indoor light levels only briefly or intermittently, it is an indication that the device is indoors. Another characteristic of light levels outdoors is that, during sunset and sunrise, the light level transitions slowly from dark to bright and vice versa through a light level typically referred to as dusk. Indoor light levels typically transition from dark to bright, or vice versa, very quickly since they are typically turned on and off by a simple switch. Even indoor lighting that is controlled by a typical household dimmer changes relatively quickly when compared to the slow transitions that occur outside during sunset and sunrise.

By monitoring one or more of the above characteristics that differentiate indoor and outdoor lighting conditions, the current invention can determine whether or not the device is being used indoors or outdoors. When used outdoors, the invention may also use a timer to measure how long it is dark each night and then use the night's length to determine the season of the year. The operation of the device can then be varied seasonally. For instance, a device such as an illuminated ornament can be adjusted to run longer in the winter, when nights are long, and run for less time during the summer when nights are short, resulting in less energy consumption.

An additional feature of the current invention is the inclusion of a 24 hour repeating timer. Initially the timer is set to 00:00:00 hours and starts counting until it reaches 24:00:00 hours, at which time the timer resets to 00:00:00 hours. Each time the timer reaches 00:00:00 hours, the device is activated. In the case of an illuminated ornament, the internal light source would be turned on each time the timer reached 00:00:00 hours. At some time later, but before the timer reaches 24:00:00 hours, the device is deactivated. In the case of an illuminated ornament, this would result in the internal light source being turned off. In this manner, the device is activated and then deactivated at the same time each night. This operation is typical of many prior art products, such as electronic candles, that need to turn on and off each day at the same time for many days in a row.

By combining a 24 hour timer with an indoor/outdoor sensing function, the current invention can automatically select the proper mode of operation without the need to manually select the mode of operation using switches. Initially the 24 hour timer is set to 00:00:00 by applying power to the device. In the preferred embodiment of the invention, this is done by installing the batteries, but the same result could be achieved by other means such as a reset switch. In the preferred embodiment of the invention, this would result in the internal light source being turned on since the 24 hour timer is at 00:00:00. After a pre-determined amount of time less than 24 hours, the device would be deactivated. In the preferred embodiment, this would result in the light source being turned off. If the indoor/outdoor sensing function determines that the product is being used indoors, this pattern will repeat indefinitely until power is removed or, in the case of battery operated devices, the batteries are dead.

If at some time after power is initially applied to the device, the indoor/outdoor sensing function determines that the product is outdoors, the device will be activated at sunset each night instead of at the original time used by the 24 hour timer. In the preferred embodiment, this is accomplished by resetting the 24 hour timer to 00:00:00 when sunset is detected. Since the device is activated whenever the 24 hour timer equals 00:00:00, this will result in the device turning on each night when sunset is detected. If the device is outdoors and for some reason sunset is not detected, an extremely overcast day for instance, the 24 hour timer will still count up to 24:00:00 and then reset to 00:00:00, as described above. This will activate the device at the same time as sunset the previous day. After only one day, the activation time will only be a few minutes off from the actual sunset time. Even if there are several overcast days in a row and the device is activated at the same time each night for several days in a row, the timing or will still be small and eventually, when the overcast conditions go away, the device will re-synchronize with the time of actual sunset.

In one form thereof the present invention is directed to a method of illuminating an ornament having an electronic control circuit including a timer, a light sensing device and a light emitting device. The method comprising the steps of: determining whether or not the ornament is located outdoors with the control circuit utilizing an input from the light sensing device; activating the light emitting device in a first mode of operation is determined the ornament is not located outdoors; and, activating the light emitting device in a second mode of operation when it is determined the ornament is located outdoors.

Preferably, the method includes, during the step of determining, the step of comparing an output value from the light sensing device with a predetermined value and determining the ornament is located outdoors when the light sensing device output value is greater than the predetermined value. Alternatively, the method can include, during the step of determining, comparing an output value from the light sensing device with a predetermined value and determining the ornament is located outdoors when the light sensing device output value is greater than the predetermined value for a predetermined period of time. Also alternatively, the method can include, during the step of determining, comparing an output value from the light sensing device with a first threshold value and with a second threshold value, and determining the ornament is located outdoors when the light sensing device output value transitions from above the first threshold value to below the second threshold value. Further alternatively, the method can include, during the step of determining, comparing an output value from the light sensing device with a lower threshold value and with an upper threshold value, and determining the ornament is located outdoors when the light sensing device output value transitions from above the upper threshold to below the lower threshold value. Also alternatively, the method can include, during the step of determining, comparing an output value from the light sensing device with a lower threshold value and with an upper threshold value and determining the ornament is located outdoors when the light sensing device output value is less than an upper threshold value and greater than the lower threshold value for a time period which is greater than a predetermined period of time.

Also preferably, the first mode of operation includes the step of activating the light emitting device at about the same time each day and maintaining the light emitting device activated for a preselected period of time. The second mode of operation can include the step of activating the light emitting device from when the light sensing device output transitions from above the upper threshold value to below the lower threshold value until a preselected activation period of time has lapsed. The method can include the step of determining a previous night period of time and wherein the preselected activation period of time is equal to one half the previous night period of time. Also, if the timer reaches a maximum limit, the timer is reset to zero and the light emitting device is activated for a preselected period of time.

In another form thereof, the present invention is directed to a method of illuminating an ornament having an electronic control circuit including a timer, a light sensing device and a light emitting device. The method includes the steps of: comparing an output value from the light sensing device with a lower threshold value and with an upper threshold value; counting the time during which the light sensing device output value is greater than the lower threshold value and less than the upper threshold value and thereby establishing a dusk time value; comparing the dusk time value with a preselected dusk tune value; activating the light emitting device when the dusk time value is greater than the preselected dusk time value and the light sensing device output value is less than the lower threshold value; and, deactivating the light emitting device when the dusk time value is greater than the preselected dusk time value and the light sensing device output is greater than the upper threshold.

Preferably, when the dusk time value is greater than the preselected dusk time value and the light sensing device output value is less than the lower threshold value, the dusk time value is set zero. Also, when the dusk time value is greater than the preselected dusk time value and the light sensing device output value is greater than the upper threshold value, the dusk time value is set zero. The method can further include the steps of establishing the ornament is indoors when the dusk time value is less than the preselected dusk time value, and activating the light emitting device after establishing the ornament is indoors and maintaining the light emitting device activated for a preselected period of time. Also, after the step of activating the light emitting device, the light emitting device is maintained activated for a preselected period of time.

In yet another form thereof, the present invention is directed to a method of illuminating an ornament having an electronic control circuit including a timer, a light sensing device and a light emitting device. The method includes the steps of: comparing an output value from the light sensing device with a lower threshold value and with an upper threshold value; counting the time during which the light sensing device output value is greater than the lower threshold value and less than the upper threshold value and thereby establishing a dusk time value; comparing the dusk time value with a preselected dusk time value; establishing a sunset has occurred when the dusk time value is greater than the preselected dusk time value and the light sensing device output value is less than the lower threshold value; establishing a sunrise has occurred when the dusk time value is greater than the preselected dusk time value and the light sensing device output is greater than the upper threshold; activating the light emitting device after establishing a sunset has occurred when the light sensing device output value is less than the lower threshold value; and, deactivating the light emitting device after establishing a sunrise has occurred when the light sensing device output is greater than the upper threshold.

Preferably, after the step of activating the light emitting device, the light emitting device is maintained activated for a preselected period of time. The method can include the steps of: counting the time between when the sunset occurrence is established and when the sunrise occurrence is established and thereby establishing a night time value; selecting an activation period of time relative to the night time value; and, maintaining the light emitting device activated for period equal to the selected activation period of time. Alternatively, the method can include the steps of: counting the time between when the sunset occurrence is established and when the sunrise occurrence is established and thereby establishing a night time value; selecting an activation period of time equal to one half the night time value; and, maintaining the light emitting device activated for period equal to the selected activation period of time. Also alternatively, the method can include the steps of: counting the time between when the sunset occurrence is established and when the sunrise occurrence is established and thereby establishing a night time value; selecting a first activation period of time when the established night time value is greater than a preselected night time value; selecting a second activation period of time when the established night time value is less than the preselected night time value; and, maintaining the light emitting device activated for period equal to one of the first or second selected activation periods of time. Also, the dusk time value is preferably set to zero when the sunset and sunrise occurrences are established. The method can also include the steps of establishing the ornament is indoors when the dusk time value is less than the preselected dusk time value, and activating the light emitting device after establishing the ornament is indoors and maintaining the light emitting device activated for a preselected period of time.

BRIEF DESCRIPTION OF THE DRAWINGS

The above mentioned and other features and objects of this invention, and the manner of attaining them, will become more apparent and the invention itself will be better understood by reference to the following description of the embodiments of the invention taken in conjunction with the accompanying drawings, wherein.

Figure 1:
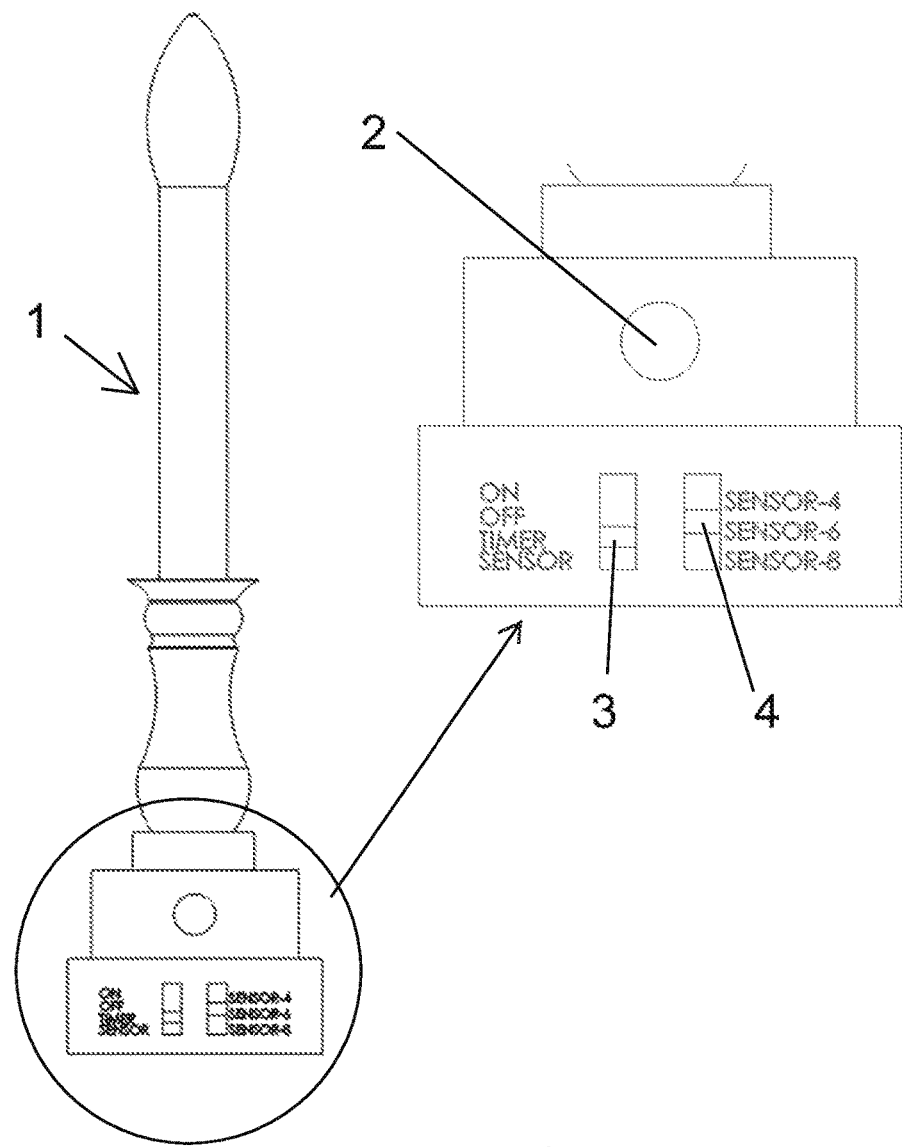
FIG. 1 shows a typical prior art illuminated ornament that includes a 24 hour repeating timer for indoor use and a light sensor with timer for outdoor use, and with a portion thereof shown in larger scale.

Corresponding reference characters indicate corresponding parts throughout several views. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION OF THE PREFERRED EMBODIMENTS

FIG. 1 shows a typical known illuminated ornament (1), a battery operated candle, as might be used in a window or on an interior shelf. Although a battery operated candle is shown, it should be understood that, as used herein, "ornaments" can include, but are not limited to globe lights, string lights such as Christmas lights, electronic candles, and any other lighting device desired to be used indoors and be turned on daily starting at about the same time and maintained on for a preselected period of tithe, or outdoors and be turned on at about dusk and maintained on for a desired preselected period of time or until about midnight. The illuminated ornament (1) includes a light sensor (2) and an internal 24 hour timer (not shown). A four position slide switch (3) can turn the candle on, off, select TIMER (an indoor timer as described above) or select SENSOR (an outdoor timer as described above). When the outdoor timer is selected and the candle (1) is in a window, the light sensor (2) turns the candle on each night when it gets dark. A second, three position slide switch (4), is used to select how long the candle remains on after it gets dark to either conserve battery power or to match the amount of time the candle remains on to the season of the year. When slide switch (3) is in the indoor timer position, the 24 hour timer turns the candle on at the same time each night and turns it off six hours later.

Figure 2A:
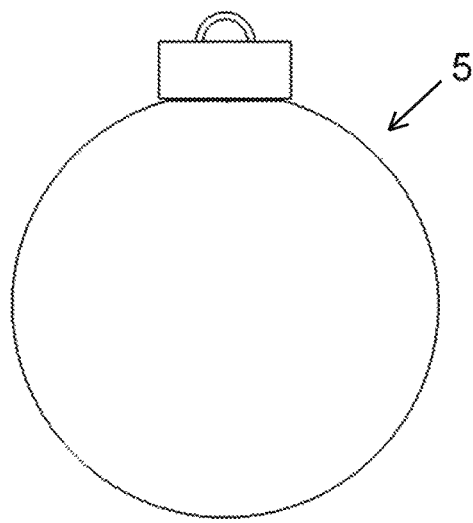
FIG. 2A shows an exemplary illuminated ornament constructed in accordance with the principles of the present invention.
Figure 2B:
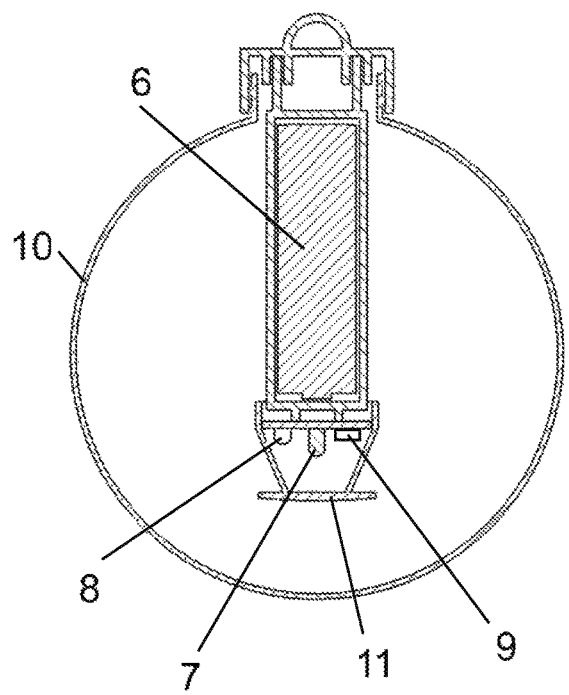
FIG. 2B shows the ornament of FIG. 2A in cross section.

FIG. 2A shows an illuminated ornament (5) in a preferred embodiment of the invention. FIG. 2B shows the ornament (5) in cross section. The ornament (5) contains a battery compartment (6) and an electric light emitting device/source (7). In the preferred embodiment, the light source (7) is an LED. The exterior wall (10) of the ornament (5) is translucent to allow external ambient light, to reach light sensor (8). Similarly, light diffuser (11) is also translucent. Control circuit (9) monitors the output of the light sensor (8) and also includes a 24 hour repeating timer. The control circuit (9) monitors the output of the light sensor (8) and compares the output to two or more thresholds. A higher or upper threshold is set high enough that if it is exceeded it is very likely that the ornament is outdoors. In a simple implementation, outputs below this threshold would indicate the ornament is indoors or that it is outdoors and dark. In a preferred embodiment, a lower threshold lower than the higher threshold is used to distinguish three light levels. If the output of the light sensor (8) is above the higher threshold, the sensor is probably outdoors during daylight. If the output is below the lower threshold, the ornament is either indoors or outdoors and it is dark. If the output is between the two thresholds, the ornament is in an environment with intermediate light levels such as might be experienced at dusk if outdoors or in a brightly lit room if indoors. Additional thresholds between the higher threshold and the lower threshold could be added to differentiate several intermediate light levels, each of which must be detected in order to confirm outdoor operation.

In a preferred embodiment, the control circuit monitors the amount of time the output of the light sensor (8) remains at an intermediate value between the two thresholds when transitioning from above the higher threshold to below the lower threshold, or from below the lower threshold to above the higher threshold. This intermediate time can be used to differentiate between interior lights being switched on or off and the occurrence of a sunset or sunrise. If the intermediate time is less than a few seconds, the ornament is probably indoors. If the higher threshold is selected so that outputs from the light sensor (8) above the higher threshold correspond to daylight and outputs below the lower threshold correspond to dark, then outputs between the two thresholds will correspond to dusk or dawn conditions (for simplicity and ease in description, hereinafter "dusk" will refer to both dusk and dawn conditions where the light sensor (8) is at an intermediate vain between the higher and lower thresholds). If, over a period of time, the controller (9) detects a daylight-dusk-dark transition where the dusk time is greater than a few seconds, the controller (9) determines that a sunset has occurred. Similarly, if a dark-dusk-daylight transition occurs where the dusk time is greater than a few seconds, the controller (9) determines that a sunrise has occurred. In a preferred embodiment, dusk times of at least 30 seconds are required to conclude that the ornament is being used outdoors. When the controller (9) determines that a sunset has occurred, the 24 hour timer which is also sometimes referred to herein as a "clock" is reset to 00:00:00 and the ornament turns on. If a sunset is not detected by the controller (9), the 24 hour timer continues running until it reaches 24:00:00 and resets to 00:00:00 which will also turn the ornament on. In this manner, the ornament will always turn on each day either by the 24 hour timer reaching 24:00:00 or by a sunset being detected. In the spring, when days are getting longer, it is likely that the 24 hour timer will reach 24:00:00 before the next day's sunset is detected. In this case, the ornament will turn on when the 24 hour tuner resets to 00:00:00, which will be a little before sunset. When sunset does occur a little latter, the controller (9) will reset the 24 hour timer again to 00:00:00. Allowing the controller (9) to reset the 24 hour timer whenever it detects sunset insures that when used outdoors, any errors caused by shortening days, lengthening days, overcast days, etc., will get corrected when the next sunset is detected.

In a preferred embodiment, the controller (9) also monitors how long the output of the light sensor (8) remains above the higher threshold (daylight conditions). If this time is less than a preselected value, the controller (9) assumes the ornament is indoors will not use the next detected sunset to reset the 24 hour timer. In the preferred embodiment, if the output of the light sensor does not remain above the higher threshold for at least 4 hours, the controller assumes the ornament is indoors. This prevents the controller (9)

from incorrectly concluding that the ornament is outdoors when used indoors and briefly exposed to daylight conditions.

Figure 3A:
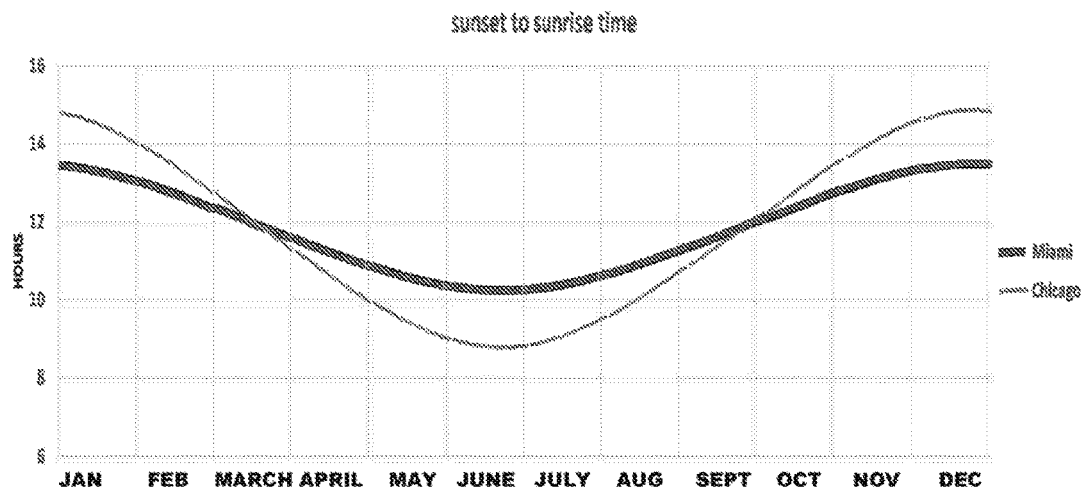
FIG. 3A is a graph of the variations in sunset to sunrise times (hours) for Chicago and Miami USA.
Figure 3B:
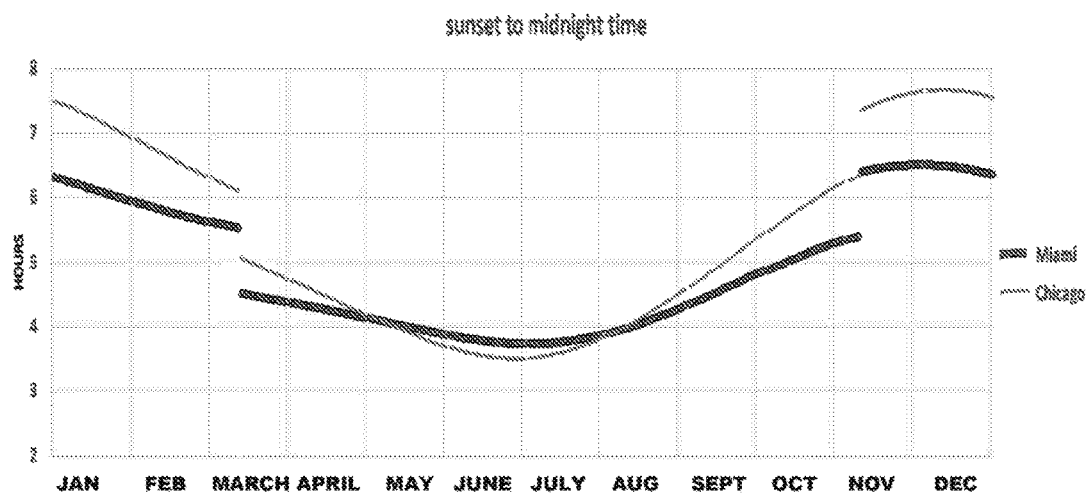
FIG. 3B is a graph of the variations in sunset to midnight times (hours) for Chicago and Miami USA with Daylight Savings Time adjustment included.

In the preferred embodiment, the controller (9) also monitors how long the output of the light sensor (8) remains below the lower threshold (dark) between the times when sunset and sunrise are detected. This time will vary with the season of the year. FIG. 3A shows this variation for two cities in the USA; Miami and Chicago. As is well known, the nights get shorter during the summer months and longer during the winter months. The variation increases the further you are from the equator. Late in the evening when most people have retired, especially for battery operated products, it is desirable to turn the product off to conserve energy and prolong battery life. FIG. 3B is similar to FIG. 3A but instead of night length shows the change in time from sunset to midnight as the seasons vary. The discontinuities in the curves in March and November show the effect of using daylight savings time. As can be seen in FIG. 3B, if it is desired to turn the product off around midnight each night, only four hours of on time would be needed in the middle of summer, but almost 8 hours would be needed in the middle of winter. The controller (9) monitors the night lengths and adjust the on time of the ornament. A convenient reference point is when the night length is 12 hours. As shown in FIG. 3A, this occurs at approximately the same two days of the year for Chicago and Miami even though they are at widely separated latitudes. In fact, latitude has very little effect on the days of the year when the night length is exactly 12 hours. In a preferred embodiment of the invention, the ornament runs for 8 hours if nights are longer than 12 hours and runs for 4 hours when night are shorter than 12 hours. In another preferred embodiment, the transition from an 8 hour on time to a 4 hour on time, or vice versa, is gradual with the on time increasing or decreasing in small steps. When multiple ornaments are used in the same location, it is likely that they will not all detect sunset at exactly the same time. Without this gradual transition, some of the ornaments might run for 4 hours and some might run for 8 hours during the days just before and just after the day when the night length was close to the 12 hour threshold. Using a gradual transition prevents large on time differences in multiple ornaments when night lengths are transitioning through the 12 hour threshold.

Figure 4:
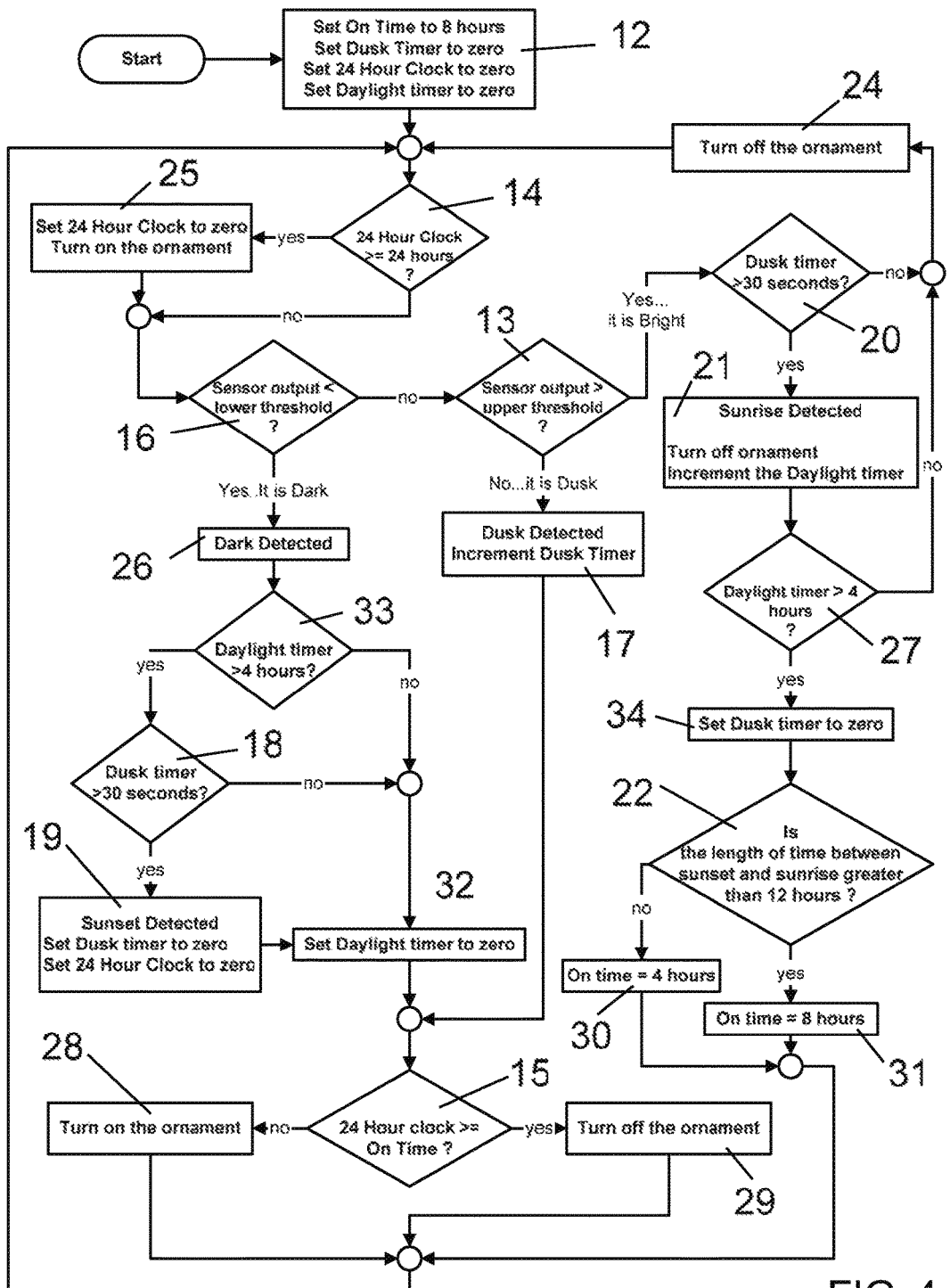
FIG. 4 is a flow chart of illuminating an ornament in accordance with the method of the present invention.

FIG. 4 shows a simplified flow chart detailing the algorithm used by the controller (9) to implement the invention. When power is initially applied or a reset occurs, the 24 hour clock/timer is set to zero and begins keeping time, the On Time/activation time is set to eight hours, the Daylight Timer is set to zero, and the Dusk Timer is set to zero (12). Whenever the 24 hour timer reaches/equals 24 hours, it is reset to zero (14)(25) thereby creating a 24 hour repeating clock. Whenever the 24 hour clock is between zero and the on time selected by the controller (9) (when the 24 hour clock value is less than the selected On Time), the ornament is turned on (15)(28). Whenever the 24 hour clock is greater than the On Time selected by the controller (9), the ornament is turned off (15)(29).

The controller (9) monitors the light sensor (8) output to see if its output is less than a lower threshold that would indicate it is dark out (16). If the output of the light sensor (8) is above this lower threshold (16), and not above a higher threshold that would indicate daylight (13), a dusk timer is incremented (17). If at some time the output of the light sensor (8) indicates that it is dark out (16)(26), the Daylight timer is checked to see if it is greater than 4 hours (33). If it is not, then the ornament is assumed to be indoors and Daylight timer is set to zero (32) since it is dark out. If the Daylight timer is greater than 4 hours, the value of the dusk timer is checked to see if it is greater than 30 seconds (18). If the dusk timer is greater than 30 seconds, a valid sunset has occurred and the 24 hour clock is set to zero to synchronize the ornament's operation with sunset (19). The dusk timer is also set to zero (19). If the dusk timer is less than 30 seconds, the Daylight timer is set to zero (32) since it is dark out and the 24 hour timer continues counting without resetting to zero.

Similarly, if the output of the light sensor (8) indicates it is above a higher threshold that would indicate daylight (13), it is bright enough to be daylight and the Dusk timer is checked to see if it is greater than 30 seconds (20). If it is not, the ornament is turned off (24) and the 24 Hour Clock is checked to see if it has exceeded 24 hours (14). If the Dusk timer is greater than 30 seconds, sunrise is detected, the ornament is turned off and the Daylight timer begins counting (21). The Daylight timer is then checked (27). If the Daylight timer is less than 4 hours, the ornament is turned off (24). If the Daylight timer is greater than 4 hours, outdoor operation is confirmed and the Dusk timer is set to zero (34). If the length of time between sunset and sunrise is greater than twelve hours (22), the on time is set to eight hours (31); otherwise it is set to four hours (30). While night length times of other than twelve hours could be used as a reference, twelve hours is desirable as a reference time since it corresponds closely to the date in the spring and fall when daylight savings time either adds or subtracts an hour in most time zones. It some cases it may be desirable to use more than two on times, in which case multiple time references could be used to select one of the multiple on times.

In the case where the differences between the two or more on times are long, it may also be desirable to transition gradually from the old on time to the new on time. This helps insure that multiple products used in the same outdoor location will have similar on times during seasonal changes.

Figure 5:
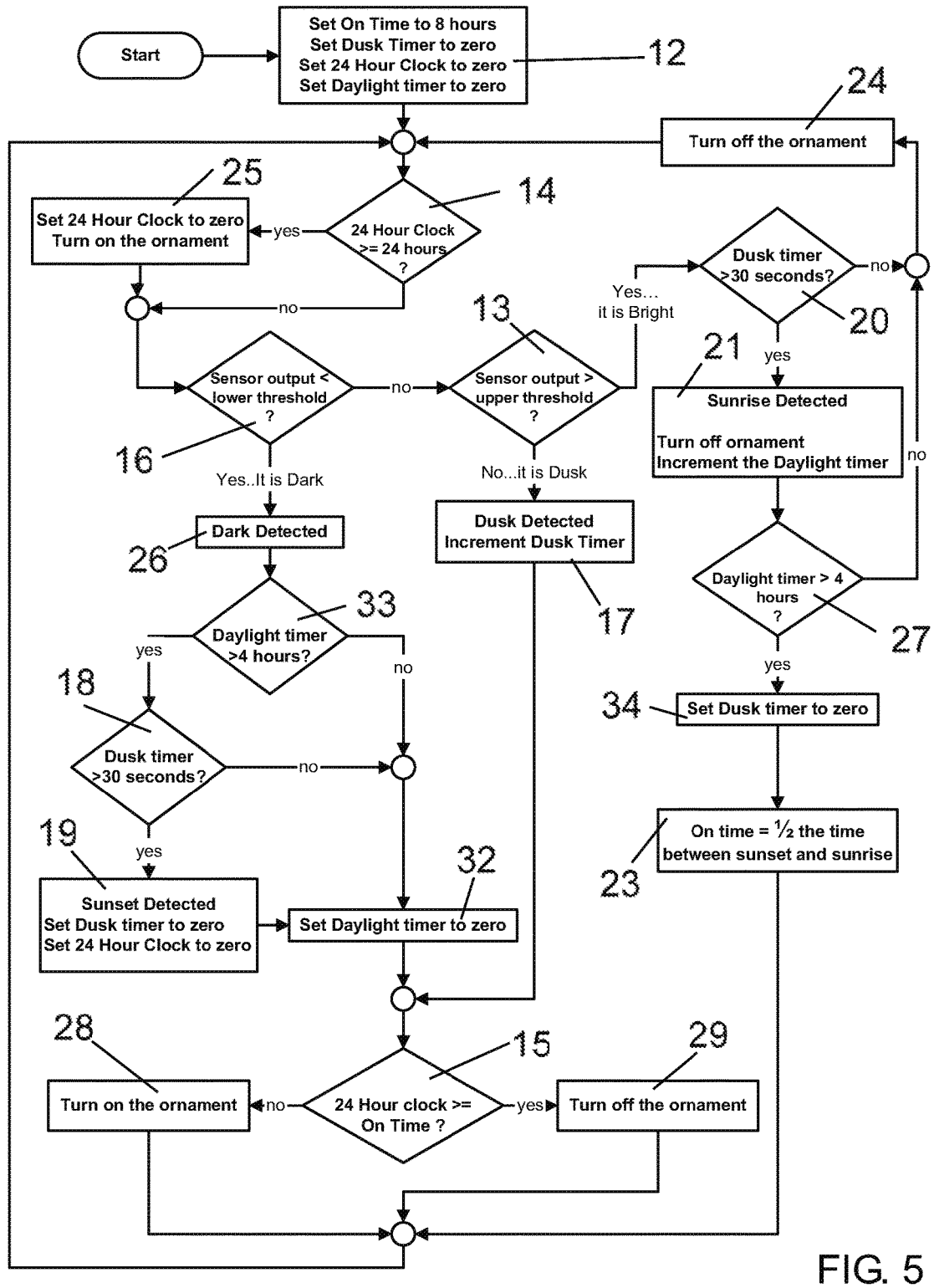
FIG. 5 is another flow chart of illuminating an ornament in accordance with the method of the present invention.

FIG. 5 shows a simplified flow chart detailing an alternate algorithm that may be used by the controller (9) to implement an embodiment invention. The flow chart in FIG. 5 is the same as the flow chart in FIG. 4 except that the decision to use a short or long on time (22) is replaced with an element (23) that sets the on time to one half the measured night length. A seasonal adjustment of on time is still achieved, but it occurs gradually throughout the year.

Figure 6:
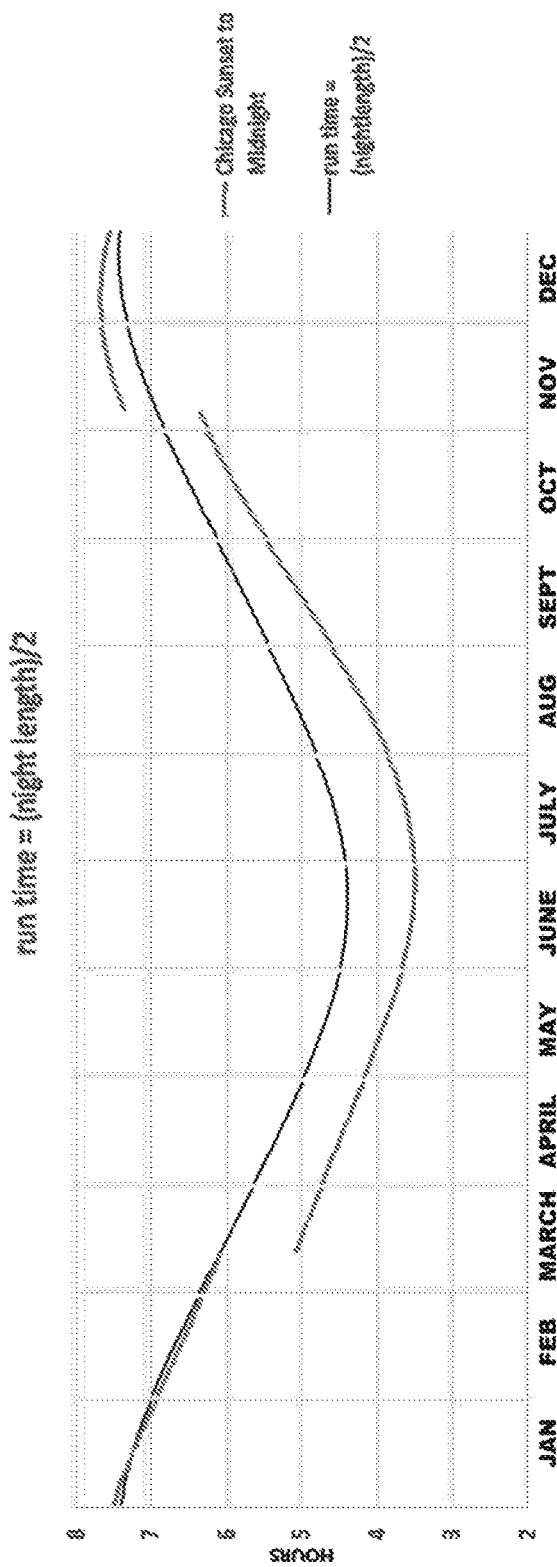
FIG. 6 is a graph showing the sunset to midnight for Chicago with daylight savings time as in FIG. 3B along with an on time that is one half of the previous night length; and, FIG. 7 is a schematic diagram of an electronic circuit constructed for illuminating an ornament in accordance with the method of the present invention.

FIG. 6 shows the sunset to midnight time for Chicago with daylight savings time as in FIG. 3B along with an on time that is one half of the previous night length. Between early November and mid-March, using an on time of one half the previous night ensures the ornament will turn off close to midnight each night. From mid-March to early November, when daylight savings time is in effect, the ornament will turn off about one hour after midnight which may be desirable during summer months. Similar results are obtained for other latitudes.

Referring again to FIG. 3A, it can be noted that the graphs of sunset to sunrise times are approximately sinusoidal with a period of 365 days and an amplitude (in hours) that increases with increasing latitude. The maximum rate of change of these approximately sinusoidal curves occurs when the night length is close to twelve hours long. In an actual application, the sunset to sunrise time will appear to vary due to cloud cover since light levels are used as a proxy to determine when sunrise and sunset occur. For instance, the light sensor's (8) sensitivity might be set to detect sunset on a cloudless day when the ambient light intensity reaches a predetermined value. On a cloudy day, as the sun begins to set, this predetermined value will occur earlier in the day. On very overcast days, the ambient light level used to detect sunset may occur much earlier than the actual sunset. This can result in night length measurements that are an hour or more longer than the actual sunset to sunrise times. To minimize errors caused by overcast days, the change in the measured night length from day to day can be compared to the maximum rate of change as predicted by curves such as shown in FIG. 3A and if the maximum rate of change is exceeded, the measured night length can be corrected. As this rate of change increases with increasing latitude, the maximum rate of change for the northern most intended latitude should be used. In the continental United States, the maximum expected rate of change would be about 3 minutes. A day to day variation in measured night length of greater than 3 minutes would indicate that the variation was caused by overcast conditions rather than a change in the time between sunset and sunrise. In this case, the measured night length would be corrected so that it does not differ more than 3 minutes from the previous night's measured night length.

Figure 7:
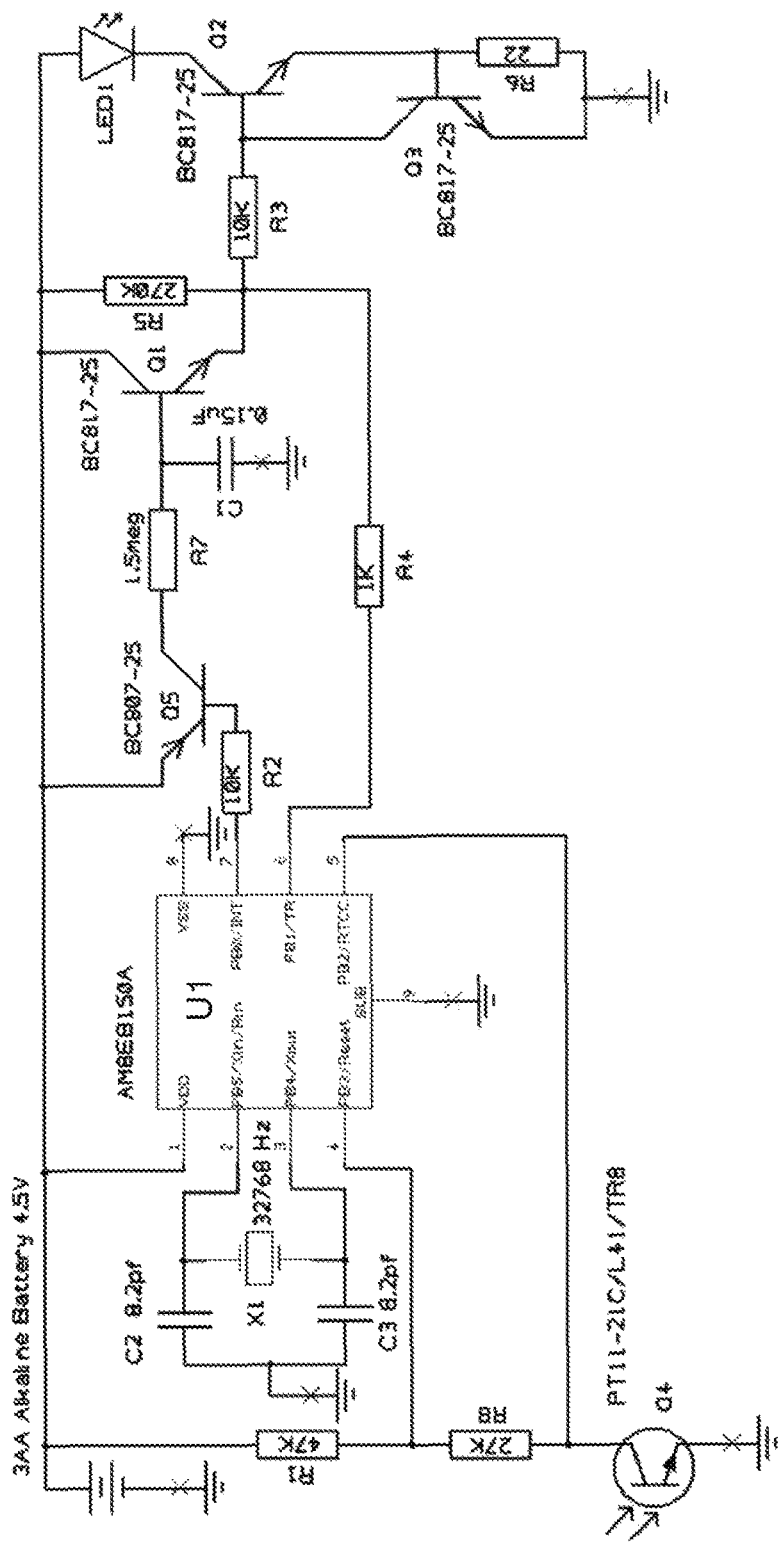

FIG. 7 is a schematic for the preferred embodiment of the invention. Q4 is a phototransistor whose output current is proportional to incident light intensity. U1 is a one-time programmable microcontroller such as an AM8EB150AS from Alpha Microelectronics Corporation. Under daylight conditions, the value of R1 is chosen so that the voltage at pins 4 and 5 of U1 will be below the input logic threshold of U1. When dark, the value of R1+R8 is chosen so that the voltage at pins 4 and 5 of U1 are above the input logic threshold. The ratio of R1 to R8 is chosen so that dusk lighting conditions cause pin 5 of U1 to be below the input logic threshold and pin 4 to be above the input logic threshold. This arrangement allows the control circuit (9) to differentiate between daylight, dusk and dark conditions. X1 is 32.768 KHz crystal Which provides an accurate time base for a 24 hour timer and a low frequency system clock to minimize operating current. The remaining circuitry is used to generate a periodic pulse in LED1. As those familiar with the art will understand, Q2, Q3 and R6 set a maximum limit on the current through LED1 determined by the base emitter voltage of Q3 and the value of R6. When Q1 is off and pin 6 of U1 is in a high impedance state, R5 provides a low level current to the base of Q2 which then illuminates LED1 at a very low light level. When pin 6 of U1 is set to a low impedance and driven high, a larger current is supplied to the base of Q2 which then illuminates LED1 at a high level as determined by Q3 and R6. When pin 6 of U1 is set to a low impedance and driven low, very little base current is supplied to Q2 and LED1 turns off.

As described above, when pin 6 of U1 is set to a high impedance, LED1 will be illuminated at a tow level due to current supplied to the base of Q2 by R5. By using Q1 to supply additional current to the base of Q2, the illuminated intensity of LED1 can be increased to any desired level up to the limit set by Q3 and R6. By applying various amounts of charge to C1, Q1 can be turned on to various degrees, which will in turn illuminate LED1 to various degrees. By turning Q5 on and off at appropriate times, the amount of charge on C1 can be varied to produce a desired illumination pattern in LED1.

A final aspect of the design uses pin 6 of U1 as an input to measure the decay time of C1. When Q5 is turned on, C1 will charge to a maximum value and pin 6 of U1 will be above the input logic threshold. If Q5 is then turned off, C1 will slowly discharge and sometime later pin 6 of U1 will be below the input logic threshold. This time is proportional to the value of C1 and will vary from ornament to ornament due to production variations in C1. By using this measured variation to set the timing by which Q5 is turned on and off, the illumination pattern in LED1 will vary slightly from ornament to ornament, creating a pleasing effect when multiple ornaments are used in the same location.

In operation, referring to FIGS. 4 and 5, if the ornament (1) is located indoors and the room is dark, when the power is initially applied to the circuit (9), the 24 hour clock/timer is set to zero and begins keeping time, the On Time is set to eight hours, the Daylight timer is set to zero, and the Dusk Timer is set to zero (12). If 24 hours has not lapsed (14) the sensor output is checked to see if it's less than the lower threshold (16). Since the room is dark, the sensor output will be less than the lower threshold, and dark will be detected (26). Then, the Daylight timer is checked to see if it's greater than 4 hours (33). If it is less than four hours, it was not daylight long enough to confirm the ornament is outdoors and the Daylight timer is set to zero (32). If the Daylight timer was greater than 4 hours (33), the dusk timer is checked (18). If a dusk condition was not previously experienced (such as when indoors) the dusk time will be less than 30 seconds, and the Daylight timer will be set to zero (32) since it is dark out. After the Daylight timer is set to zero, the clock value will be checked to see if it's equal to or greater than the desired On Time or eight hours (15). If eight hours has not lapsed, the ornament is turned on, or remains on (28), and the clock is again checked to see if 24 hours have lapsed (14). This loop will of course continue and the ornament will remain on until eight hours have lapsed and the clock is greater than the preset On Time of eight hours (15), at which point the ornament will be turned off (29) and the clock is again checked to see if 24 hours have lapsed (14). Eventually, assuming that the interior light levels remain below the lower threshold in (16), the 24 hour clock will reach 24 hours, the 24 hour clock will be set to zero (25), the ornament will be turned on (25), and the cycle will continue. If lights in the room are turned on before eight hours have lapsed, and they are bright enough to be detected as daylight (13), the Dusk timer is checked (20) and will be less than 30 seconds since the ornament is indoors. The ornament is turned off (24) and the 24 Hour Clock is checked (14). While the bright interior lights remain on, the controller (9) will continue to cycle through steps (14), (16), (13), (20), (24) until the 24 hour clock reaches 24 hours (14)(25) or until the interior lights are turned off, in which case the controller (9) will return to cycling through steps (14), (16), (26), (33), (32), (15) as described above for the case of a dark room. If the ornament is initially turned on in a brightly lit room, the result is similar except that the initial path will be (14), (16), (13), (20), (24) instead of (14), (16), (26), (33), (32), (15). If the bright indoor lights are eventually turned off, the path will revert to (14), (16), (26), (33), (32), (15) as described above.

If the ornament is located outdoors and it is dark when the power is initially applied to the ornament, operation will be as described above for indoor operation when it is dark when power is initially applied and the initial path will be (14), (16), (26), (33), (32), (15). As sunrise approaches, at some time the output of the light sensor (8) will exceed the lower threshold (16) but will be remain below the upper threshold (13) indicating that it is dusk (17) and the dusk timer is incremented (17). While the output of the light sensor (8) remains between the upper and lower thresholds, the path becomes (14), (16), (13), (17), (15) and the dusk timer continues to increment. During a normal sunrise, the dusk tuner will increment to at least 30 seconds. As sunrise continues, the output level of light sensor (8) will eventually exceed the upper threshold (13) and Dusk timer is checked (20) and will be greater than 30 seconds in normal outdoor operation and sunrise is detected (21). The ornament is turned off and the Daylight timer is incremented (21). The Daylight timer is then checked (27) and if it has been daylight for less than 4 hours operation continues as if the ornament was indoors, the ornament is turned off (24) and the 24 Hour Clock is checked (14). The loop (14), (16), (13), (20), (21), (27), (24) will continue incrementing the Daylight timer as long as the output of the light sensor (8) is above the upper threshold (13). When the Daylight timer exceeds 4 hours (27), the Dusk timer is set to zero (34) and the time between sunset and sunrise is used to set the on time of the ornament (22) or (23). As the day progresses and sunset approaches, the output of the light sensor (8) will decrease to a level that is below the upper threshold and above the lower threshold and the path will change to (14), (16), (13), (17), (15) and the Dusk timer will increment to beyond 30 seconds during a normal sunset. As it gets darker, the output of the light sensor (8) will eventually fall below the lower threshold and Dark will be detected (26). The Daylight timer is then checked (33). If it is less than 4 hours the ornament was probably indoors and the Daylight timer is set to zero (32) and the 24 Hour Clock is checked to see if the ornament should be on or off (15). In normal outdoor operation, the Daylight timer will be greater than 4 hours (33), confirming outdoor operation. The dusk timer will be checked (18) and will be greater than 30 seconds, so sunset is detected (19). The dusk timer is set to zero (19), the 24 Hour Clock is set to zero (19), and the Daylight timer is set to zero (32). The 24 Hour Clock is checked to see if the ornament should be on (15) and since the 24 Hour Clock was just set to zero, the ornament will be turned on (28). In this manner, the 24 Hour Clock will also be set to zero at sunset each day when the product is outdoors.

If the ornament is outdoors and it is daylight when power is initially applied, the initial cycle will be (14), (16), (13), (20), (24) until the output of light sensor (8) falls slightly below the upper threshold during sunset which will change the path to (14), (16), (17), (15). The dusk timer will increment beyond 30 seconds and eventually the output of light sensor (8) will fall below the lower threshold (16). On this first day of operation the Daylight counter will not have reached 4 hours, so sunset will not be detected (19). Since it would be desirable to detect sunset on the first day of operation, additional logic can be included (not shown) that modifies the Daylight timer requirements on the first day of operation only so that a sunset can be detected.

While this invention has been described as having an exemplary design, the present invention may be further modified within the spirit and scope of this disclosure. This application is therefore intended to cover any variations, uses, or adaptations of the invention using its general principles.

What is claimed is:

1. A method of illuminating n ornament comprising an electronic control circuit including a timer, a light sensing device and a light emitting device, wherein said timer is capable of activating said light emitting device at a selected start time each day and then deactivating said light emitting device after a selected elapsed amount of time, said method comprising the steps of:

determining whether or not the ornament is located outdoors with said control circuit utilizing an input from said light sensing device;

detecting when a sunset has occurred with said control circuit by utilizing an input from said light sensing device;

activating said light emitting device in a first mode of operation when it is determined the ornament is not located outdoors, wherein said first mode uses said timer to activate said light emitting device at said selected start time each day and then deactivates said light emitting device after said selected elapsed amount of time;

activating said light emitting device in a second mode of operation when it is determined the ornament is located outdoors, wherein said second mode activates said light emitting device when said sunset occurs and then deactivates said light emitting device after a selected amount of time; and, determining a previous night period of time and wherein said selected elapsed amount of time is equal to a fraction of said previous night period of time.

2. The method of claim 1 further comprising, during said step of determining, comparing an output value from said light sensing device with a predetermined value and determining the ornament is located outdoors when said light sensing device output value is greater than said predetermined value.

3. The method of claim 1 further comprising, during said step of determining, comparing an output value from said light sensing device with a predetermined value and determining the ornament is located outdoors when said light sensing device output value is greater than said predetermined value for a predetermined period of time.

4. The method of claim 1 further comprising, during said step of detecting, comparing an output value from said light sensing device with a first threshold value and with a second threshold value, and detecting that a sunset has occurred when said light sensing device output value transitions from above said first threshold value to below said second threshold value.

5. The method of claim 1 further comprising, during said step of determining, comparing an output value from said light sensing device with a lower threshold value and with an upper threshold value, and determining the ornament is located outdoors when said light sensing device output value transitions from above said upper threshold to below said lower threshold value.

6. The method of claim 1 further comprising, during said step of determining, comparing an output value from said light sensing device with a lower threshold value and with an upper threshold value and determining the ornament is located outdoors when said light sensing device output value is less than a upper threshold value and greater than said lower threshold value for a time period which is greater than a predetermined period of time.

7. The method of claim 1 further comprising determining a previous night period of time wherein said selected elapsed amount of time is equal to one half said previous night period of time.

8. The method of claim 1 wherein, if said timer reaches a maximum limit, said timer is reset to zero and said light emitting device is activated for a preselected period of time.

9. A method of illuminating an ornament comprising an electronic control circuit including a timer, a light sensing device and a light emitting device, said method comprising the steps of:

determining whether or not the ornament is located outdoors with said control circuit utilizing an input from said light sensing device;

activating said light emitting device in a first mode of operation when it is determined the ornament is not located outdoors;

activating said light emitting device in a second mode of operation when it is determined the ornament is located outdoors;

wherein said second mode of operation comprises activating said light emitting device from when said light sensing device output transitions from above an upper threshold value to below a lower threshold value until a preselected activation period of time has lapsed; and, determining a previous night period of time and wherein said preselected activation period of time is equal to one half said previous night period of time.

10. A method of illuminating an ornament comprising an electronic control circuit including a timer, a light sensing device and a tight emitting device, said method comprising the steps of:

comparing an output value from said light sensing device with a lower threshold value and with an upper threshold value;

counting the time during which said light sensing device output value is greater than said lower threshold value and less than said upper threshold value and thereby establishing a dusk time value;

comparing said dusk time value with a preselected dusk time value;

activating said light emitting device when said dusk time value is greater than said preselected dusk time value and said light sensing device output value is less than said lower threshold value; and, deactivating said light emitting device when said dusk time value s greater than said preselected dusk time value and said light sensing device output is greater than said upper threshold.

11. The method of claim 10 wherein, when said dusk time value is greater than said preselected dusk time value and said light sensing device output value is less than said lower threshold value, said dusk time value is set zero.

12. The method of claim 10 wherein, when said dusk time value is greater than said preselected dusk time value and said light sensing device output value is greater than said upper threshold value, said dusk time value is set zero.

13. The method of claim 10 further comprising the steps of establishing said ornament is indoors when said dusk time value is less than said preselected dusk time value, and activating said light emitting device after establishing said ornament is indoors and maintaining said light emitting device activated for a preselected period of time.

14. The method of 10 wherein, after said step of activating said light emitting device, said light emitting device is maintained activated for a preselected period of time.

15. A method of illuminating an ornament comprising an electronic control circuit including a timer, a light sensing device and a light emitting device, said method comprising the steps of:

comparing an output value from said light sensing device with a lower threshold value and with an upper threshold value;

counting the time during which said light sensing device output value is greater than said lower threshold value and less than said upper threshold value and thereby establishing a dusk time value;

comparing said dusk time value with a preselected dusk time value;

establishing a sunset has occurred when said dusk time value is greater than said preselected dusk time value and said light sensing device output value is less than said lower threshold value;

establishing a sunrise has occurred when said dusk time value is greater than said preselected dusk time value and said light sensing device output is greater than said upper threshold;

activating said light emitting device after establishing a sunset has occurred when said light sensing device output value is less than said lower threshold value; and, deactivating said light emitting device after establishing a sunrise has occurred when said light sensing device output is greater than said upper threshold.

16. The method of 15 wherein, after said step of activating said light emitting device, said light emitting device is maintained activated for a preselected period of time.

17. The method of 15 further comprising the steps of:

counting the time between when said sunset occurrence is established and when said sunrise occurrence is established and thereby establishing a night time value;

selecting an activation period of time relative to said night time value; and, maintaining said light emitting device activated for period equal to said selected activation period of time.

18. The method of 15 further comprising the steps of:

counting the time between when said sunset occurrence is established and when said sunrise occurrence is established and thereby establishing a night time value;

selecting an activation period of time equal to one half said night time value; and, maintaining said light emitting device activated for period equal to said selected activation period of time.

19. The method of 15 further comprising the steps of:

counting the time between when said sunset occurrence is established and when said sunrise occurrence is established and thereby establishing a night time value;

selecting a first activation period of time when said established night time value is greater than a preselected night time value;

selecting a second activation period of time when said established night time value is less than said preselected night time value; and, maintaining said light emitting device activated for period equal one of said first or second selected activation periods of time.

20. The method of claim 15 wherein said dusk time value is set zero when said sunset and sunrise occurrences are established.

21. The method of claim 15 further comprising the steps of establishing said ornament is indoors when said dusk time value is less than said preselected dusk time value, and activating said light emitting device after establishing said ornament is indoors and maintaining said light emitting device activated for a preselected period of thine.

22. A method of illuminating an ornament comprising an electronic control circuit including a timer, a light sensing device and a light emitting device, said method comprising the steps of:

said timer activating said light emitting device when its count is greater than a first value and less than a second value and deactivating said light emitting device when its count is greater than said second value;

wherein said timer resets itself to said first value when it reaches a maximum value;

determining whether or not the ornament is located outdoors and, if outdoors, detecting when sunset occurs by means of said control circuit utilizing an input from said light sensing device; and, resetting said timer to said first value if said sunset is detected.

23. The method of claim 22 further comprising, during said step of determining, comparing an output value from said light sensing device with a predetermined value and determining the ornament is located outdoors when said light sensing device output value is greater than said predetermined value.

24. The method of claim 22 further comprising, during said step of determining, comparing an output value from said light sensing device with a predetermined value and determining the ornament is located outdoors when said light sensing device output value is greater than said predetermined value for a predetermined period of time.

25. The method of claim 22 further comprising, during said step of detecting, comparing an output value from said light sensing device with a first threshold value and with a second threshold value, and detecting that a sunset has occurred when said light sensing device output value transitions from above said first threshold value to below said second threshold value.

26. The method of claim 22 further comprising, during said step of determining, comparing an output value from said light sensing device with a lower threshold value and with an upper threshold value, and determining the ornament is located outdoors when said light sensing device output value transitions from above said upper threshold to below said lower threshold value.

27. The method of claim 22 further comprising, during said step of determining, comparing an output value from said light sensing device with a lower threshold value and with an upper threshold value and determining the ornament is located outdoors when said light sensing device output value is less than a upper threshold value and greater than said lower threshold value for a time period which is greater than a predetermined period of time.

28. The method of claim 22 further comprising determining a previous night period of time wherein said selected elapsed amount of time is equal to one half said previous night period of time.

* * * * *

UNITED STATES PATENT AND TRADEMARK OFFICE
CERTIFICATE OF CORRECTION

PATENT NO. : 10,237,942 B2
APPLICATION NO. : 15/627642
DATED : March 19, 2019
INVENTOR(S) : Kim Irwin McCavit et al.

It is certified that error appears in the above-identified patent and that said Letters Patent is hereby corrected as shown below:

In the Specification

Column 4, Line 36, delete "or" and insert --error--

Column 4, Line 46, after "operation" insert --when it--

Column 5, Line 38, delete "tune" and insert --time--

Column 7, Line 10, after "midnight" insert --time--

Column 7, Line 34, delete "tithe" and insert --time--

Column 8, Line 29, delete "vain" and insert --value--

Column 8, Line 49, delete "tuner" and insert --timer--

Column 11, Line 37, delete "Which" and insert --which--

Column 11, Line 53, delete "tow" and insert --low--

Column 13, Line 1, delete "tuner" and insert --timer--

In the Claims

Column 13, Claim 1, Line 58, delete "n" and insert --an--

Column 15, Claim 10, Line 17, delete "tight" and insert --light--

Column 15, Claim 10, Line 33, delete "s" and insert --is--

Signed and Sealed this
Twenty-fifth Day of June, 2019

Andrei Iancu
*Director of the United States Patent and Trademark Office*

CERTIFICATE OF CORRECTION (continued)
U.S. Pat. No. 10,237,942 B2

Column 16, Claim 19, Line 45, after "equal" insert --to--

Column 16, Claim 21, Line 55, delete "thine" and insert --time--